United States Patent [19]

Arzoumanidis et al.

[11] Patent Number: 5,124,297
[45] Date of Patent: * Jun. 23, 1992

[54] OLEFIN POLYMERIZATION AND COPOLYMERIZATION CATALYST

[75] Inventors: Gregory G. Arzoumanidis, Naperville, Ill.; Mark A. Drezdzon, Milwaukee, Wis.; Sam S. Lee, Hoffman Estates, Ill.

[73] Assignee: Amoco Corporation, Chicago, Ill.

[*] Notice: The portion of the term of this patent subsequent to Sep. 12, 2006 has been disclaimed.

[21] Appl. No.: 624,210

[22] Filed: Dec. 7, 1990

[51] Int. Cl.⁵ ............................................. C08F 4/651
[52] U.S. Cl. .................................. 502/120; 502/125; 502/127; 526/124
[58] Field of Search .................... 502/120, 125, 127

[56] References Cited

U.S. PATENT DOCUMENTS

| | | |
|---|---|---|
| 4,540,679 | 9/1985 | Arzoumanidis et al. ........ 502/127 X |
| 4,612,299 | 9/1986 | Arzoumanidis et al. ........ 502/120 X |
| 4,866,022 | 9/1989 | Arzoumanidis et al. ........... 502/120 |
| 4,946,816 | 8/1990 | Cohen et al. ................... 502/125 X |
| 4,988,656 | 1/1991 | Arzoumanidis et al. ........... 502/127 |
| 5,013,702 | 5/1991 | Arzoumanidis et al. ........... 502/120 |

*Primary Examiner*—Patrick P. Garvin
*Attorney, Agent, or Firm*—James R. Henes; William H. Magidson; Frank J. Sroka

[57] ABSTRACT

A catalyst or catalyst component for the polymerization of copolymerization of alpha-olefins, which is formed by a process comprising forming a solution of a magnesium-containing species in a liquid comprising at least one alcohol.

27 Claims, No Drawings

OLEFIN POLYMERIZATION AND COPOLYMERIZATION CATALYST

CROSS REFERENCE TO RELATED APPLICATIONS

This application is related to U.S. patent application Ser. No. 434,915 filed Nov. 9, 1989 and now U.S. Pat. No. 5,013,702, which in turn is a divisional of U.S. patent application Ser. No. 351,408, filed May 12, 1989, and now U.S. Pat. No. 4,988,686, which in turn is a divisional of U.S. patent application Ser. No. 186,359, filed Apr. 25, 1988, U.S. Pat. No. 4,866,022, which in turn was a continuation of patent application Ser. No. 055,430, filed May 28, 1987 and now abandoned, which in turn is a continuation-in-part of U.S. patent application Ser. No. 875,180 filed Jun. 17, 1986 and now abandoned, which was a continuation-in-part of U.S. patent application Ser. No. 741,858 filed Jun. 6, 1985, now U.S. Pat. No. 4,612,299, which was continuation-in-part of U.S. patent application Ser. Nos. 629,106 filed Jul. 9, 1984, now abandoned, and 592,910 filed Mar. 23, 1984, now U.S. Pat. No. 4,540,679, the specifications and claims of which in their entirety are specifically incorporated herein by reference.

BACKGROUND OF THE INVENTION

1. Field of the Invention

This invention relates to a catalyst component or catalyst system that is useful for polymerizing or copolymerizing alpha-olefins and more particularly concerns a magnesium-containing supported titanium halide-based alpha-olefin polymerization or copolymerization catalyst component or catalyst.

2. Discussion of the Prior Art

Magnesium-containing supported titanium halide-based alpha-olefin polymerization or copolymerization catalyst components or catalyst systems containing such components are now well known in the art. Typically, these catalyst components and catalyst systems are recognized for their performance based on activity and stereospecificity. However, commercial olefin polymerization or copolymerization, especially gas-phase alpha-olefin polymerization or copolymerization, requires additional catalyst attributes for economical large-scale operation. Specifically, polymer or copolymer morphology is often critical and typically depends upon catalyst morphology. Good polymer morphology generally involves uniformity of particle size and shape, resistance to attrition and an acceptably high bulk density. Minimization of very small particles (fines) typically is very important, especially in gas-phase polymerizations or copolymerizations in order to avoid transfer or recycle line pluggage. Therefore, it is highly desirable to develop alpha-olefin polymerization and copolymerization catalysts and catalyst components that have improved morphology. For example, experience indicates that, in order to produce high ethylene content/high melt flow rate impact copolymers of ethylene and propylene having a median particle size of at least 1000 microns, it is necessary to employ a copolymerization catalyst having a median particle size of at least 35-55 microns. Another property which is important commercially is the maintenance of an acceptably high bulk density. Typically, this property is measured in pounds per cubic foot of polymer or copolymer.

Whatever the cause, production of small polymer particles and polymer of broad particle size distribution are disadvantageous for several reasons. From the standpoint of polymerization process efficiency, high levels of small polymer particles can cause problems because the particles tend to accumulate in, and plug, process lines and filters. From the standpoint of handling and processing of polyolefins, small polymer particles and broad particle size distribution can be disadvantageous because polymer bulk density often is lower than desired and an extrusion and/or pelletization step often is required prior to processing.

Numerous individual processes or process steps have been disclosed which have as their purpose the provision of improved supported, magnesium-containing, titanium-containing, electron donor-containing olefin polymerization or copolymerization catalysts. For example, the use of carbon dioxide in preparing a magnesium-containing support has been described in the aforementioned U.S. Pat. No. 4,540,679 as a means to improve control of the morphology of the catalyst and hence of the polymer product. Also, in a different context use of carbon dioxide was described in U.S. Pat. Nos. 4,246,383; 2,244,838; 4,529,715; and 4,530,915. Treating alcoholic solutions and suspensions of alkaline earth alcoholates with carbon dioxide or sulfur dioxide was noted in Chemical Abstracts, Vol. 76, 853050v (1972). Forming a soluble magnesium species has been described in U.S. Pat. Nos. 4,315,874; 4,399,054; 4,071,674; and 4,439,540. Examples of use of silicon compounds in formation of a catalyst component include U.S. Pat. Nos. 4,071,672; 4,085,276; 4,220,554; and 4,315,835. Tetrahydrofuran (THF) has been described variously to complex a magnesium chloride species (e.g., U.S. Pat. Nos. 4,482,687, 4,277,372, 3,642,746, and 3,642,772 and in European Pat. No. 131,832); as modifier in a cocatalyst (e.g., U.S. Pat. Nos. 4,158,642 and 4,148,756); and as a solvent (e.g., U.S. Pat. Nos. 4,477,639 and 4,518,706). However the specific combination of steps taught in this invention to produce a catalyst with extremely advantageous properties has not been disclosed.

Arzoumanidis et al., aforesaid U.S. Pat. No. 4,866,022 discloses a method for forming a particularly advantageous alpha-olefin polymerization or copolymerization catalyst or catalyst component that involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarboxyl carbonate or magnesium carboxylate; 2) precipitating solid particles from such magnesium-containing solution by treatment with a transition metal halide and an organosilane; 3) reprecipitating such solid particles from a mixture containing a cyclic ether; and 4) treating the reprecipitated particles with a transition metal compound and an electron donor. Alcohols that are useful in solvating magnesium carbonates and carboxylates are disclosed in column 4, lines 36-44 as including: "those having the structure HOR' wherein R' is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used such as methanol, ethanol, propanol, isopropanol, tert-butyl alcohol, cyclohexanol, 2-ethylhexanol, dodecanol, and the like. Of these, 2-ethyl-1-hexanol is preferred." The ratio of the total number of moles of the alcohol employed-to-the magnesium hydrocarbyl carbonate or carboxylate from which the magnesium-containing species is formed in the examples in U.S. Pat. No. 4,866,022 is 1.32:1.

Arzoumanidis et al., aforesaid U.S. Pat. No. 4,540,679 disclose a process for the preparation of a magnesium hydrocarbyl carbonate by reacting a suspension of a magnesium alcoholate in an alcohol with carbon dioxide and reacting the magnesium hydrocarbyl carbonate with a transition metal component. Sufficient alcohol is employed to form a solution of the resulting magnesium hydrocarbyl carbonate in the alcohol. The ratio of the total number of moles of the alcohol employed-to-the magnesium alcoholate in the examples in U.S. Pat. No. 4,540,679 is 3.9:1 to 10.5:1.

Arzoumanidis et al., aforesaid U.S. Pat. No. 4,612,299 disclose a process for the preparation of a magnesium carboxylate by reacting a solution of a hydrocarbyl magnesium compound with carbon dioxide to precipitate a magnesium carboxylate and reacting the magnesium carboxylate with a transition metal component. Alcohols are not disclosed as suitable for use as a solvent or diluent in this process.

While each of the processes of the aforesaid U.S. Pat. Nos. 4,866,022; 4,540,679; and 4,612,299 affords alpha-olefin polymerization or copolymerization catalyst or catalyst components which have improved morphology and which afford polymer or copolymer products which also have improved morphology, it is highly desirable to develop additional alpha-olefin polymerization or copolymerization catalysts or catalyst components that have even further improved morphology and that afford polymers or copolymers especially the aforesaid impact copolymers, which also have even further improved morphology.

OBJECTS OF THE INVENTION

It is therefore a general object of the present invention to provide an improved alpha-olefin polymerization or copolymerization catalyst or catalyst component having improved morphology and an improved process for producing such catalyst or catalyst component.

More particularly, it is an object of the present invention to provide an alpha-olefin polymerization or copolymerization catalyst or catalyst component having improved median particle size and particle size distribution.

It is a related object of the present invention to provide an improved process for making an alpha-olefin polymerization or copolymerization catalyst having improved median particle size and particle size distribution and at a relatively high yield.

It is a further object of the present invention to provide an improved catalyst or catalyst component for the production of high ethylene content/high melt flow rate impact copolymers of ethylene and propylene and a process for making such catalyst or catalyst component.

Other objects and advantages of the present invention will become apparent upon reading the following detailed description and appended claims.

SUMMARY OF THE INVENTION

These objects are achieved by the solid, hydrocarbon-insoluble catalyst or catalyst component of this invention for the polymerization or copolymerization of alpha-olefins, comprising a product formed by: (A) forming a solution of a magnesium-containing species in a liquid, wherein the magnesium-containing species is formed by reacting a magnesium-containing compound with carbon dioxide or sulfur dioxide; (B) precipitating solid particles from the solution of the magnesium-containing species by treatment with a transition metal halide; and (C) treating the precipitated particles with a transition metal compound and an electron donor; wherein the solution of the magnesium-containing species comprises at least one alcohol containing from 1 to 12 carbon atoms and wherein the ratio of the total number of moles of the at least one alcohol-to-the number of moles of the magnesium-containing compound is in the range of from about 1.45:1 to about 2.3:1.

The aforesaid objects are also achieved by the method of this invention comprising the aforesaid steps (A), (B) and (C) to make the aforesaid catalyst or catalyst component of this invention.

DETAILED DESCRIPTION OF THE PREFERRED EMBODIMENTS

The solid, hydrocarbon-insoluble catalyst or catalyst component of this invention for the polymerization or copolymerization of alpha-olefins comprises the product formed by the process of this invention, which comprises the step (A) of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is employed, the magnesium-containing species is a hydrocarbyl carbonate or a carboxylate. When sulfur dioxide is employed, the resulting magnesium-containing species is a sulfonate. Since the use of carbon dioxide is highly preferred, hereinafter the description is written as if carbon dioxide is used.

When a magnesium alcoholate is employed, the resulting magnesium-containing species is a magnesium hydrocarbyl carbonate. Generally, the magnesium hydrocarbyl carbonate can be prepared by reacting carbon dioxide with the magnesium alcoholate. For example, the magnesium hydrocarbyl carbonate can be formed by suspending magnesium ethoxide in ethanol, adding carbon dioxide until the magnesium ethoxide dissolves forming magnesium ethyl carbonate. If, however, the magnesium ethoxide were suspended instead in 2-ethylhexanol, at least one of magnesium 2-ethylhexyl carbonate, magnesium ethyl carbonate and magnesium ethyl/2-ethylhexyl carbonate is formed. If the magnesium ethoxide is suspended in a liquid hydrocarbon or halohydrocarbon that is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as follows:

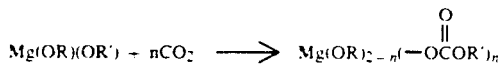

wherein n is a whole number or fraction up to 2, and wherein R and R' are identical or different hydrocarbyl groups of 1 to 20 carbon atoms. From the standpoint of cost and availability, magnesium alcoholates which are preferred for use according to this invention are those of the formula $Mg(OR')_2$ wherein R' is as defined above. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 6 to about 12 carbon atoms. Best results are attained through the use of magnesium ethoxide.

Specific examples of magnesium alcoholates that are useful according to this invention include the following: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates can also be employed if desired.

A suitable magnesium hydrocarbyl alcoholate has the formula $MgR(OR')$ wherein R and R' are as defined hereinabove for the magnesium alcoholate. On the one hand, when alcohol is used as the suspending medium for the reaction between the magnesium hydrocarbyl alcoholate and carbon dioxide or sulfur dioxide, the magnesium hydrocarbyl alcoholate is a functional equivalent of the magnesium alcoholate because the magnesium hydrocarbyl alcoholate is converted to the magnesium alcoholate in alcohol. On the other hand, when the suspending medium does not contain alcohol, the magnesium hydrocarbyl alcoholate reacts with carbon dioxide as follows:

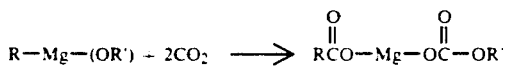

In this case,

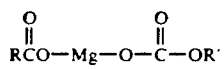

is the resulting magnesium-containing species.

When the magnesium compound from which the magnesium-containing species is formed is a hydrocarbyl magnesium compound having the formula XMgR, where X is a halogen and R is a hydrocarbyl group of 1 to 20 carbon atoms, the reaction of the hydrocarbyl magnesium compound with carbon dioxide forms a magnesium carboxylate and can be represented as follows:

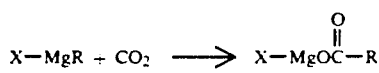

If the hydrocarbyl magnesium compound contains two hydrocarbyl groups, the reaction can be represented as follows:

where R is as defined for X-MgR.

The hydrocarbyl magnesium compounds useful in this invention have the structure R-Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR'_2$ wherein R' is as defined above. In terms of catalytic activity and stereospecificity, best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Preferably, the magnesium-containing compound is a magnesium alcoholate, and the resulting magnesium-containing species is a magnesium hydrocarbyl carbonate.

More preferably, a magnesium alcoholate is employed that is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation. Use as the magnesium-containing compound of a magnesium alcoholate produced in this manner affords a solution of the magnesium-containing species formed from it in step A of this invention that has a substantially reduced viscosity and hence is easier to work with, and also affords a catalyst or catalyst component of this invention having a substantially greater mean particle size relative to the use of a magnesium alcoholate produced by any different known method.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and so forth; haloalkanes such as 1,1,2-trichloroethane carbon tetrachloride etc. aromatics such as xylenes and ethylbenzene; and halogenated and hydrogenated aromatics such as chlorobenzene, o-dichlorobenzene, tetrahydronaphthalene and decahydronaphthalene.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Approximately 0.3 to 4 moles of $CO_2$ are added to the solution or suspension of the magnesium-containing compound with stirring at a temperature of about 0° to 100° C. over a period approximately 10 minutes to 24 hours.

Regardless of which of the aforesaid magnesium-containing compounds was employed to form the magnesium-containing species, solid particles are next precipitated in step B from the aforesaid solution of the magnesium-containing species by treatment of the solution with a transition metal halide and preferably additionally with a morphology controlling agent. The transition metal halide preferably is a titanium (IV) halide and more preferably is titanium tetrachloride. While any convenient conventional morphology controlling agent can be employed, organosilanes are particularly suitable for use as the morphology controlling agent. Suitable organosilanes for this purpose have a formula: $R_nSiR'_{4-n}$, wherein n=0 to 4 and wherein R is hydrogen or an alkyl, alkoxy, haloalkyl or aryl radical containing one to about ten carbon atoms, or a halosilyl-radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an —OR radical containing one to four carbon atoms. A suitable organosilane may contain different R' groups. Mixtures of organosilanes may be used. Preferable organosilanes include trimethylchlorosilane, trimethylethoxysilane, dimethyldichlorosilane, tetraethoxysilane, and hexamethyldisiloxane.

In this treatment of the soluble magnesium-containing species, the titanium (IV) halide component and organosilane component are contacted in amounts such that the atomic ratio of magnesium to titanium is at least about 0.3:1 and preferably, is from about 0.4:1 to about 20:1 and more preferably, from about 0.5:1 to about 3:1. The atomic ratio of silicon to titanium typically can range from about 0.1:1 to about 2.0:1 and preferably is about 0.3:1 to about 1:1.

Broadly, in accordance with this invention, the particles precipitated in step B are treated with a transition metal compound and an electron donor. Suitable transition metal compounds which can be used for this purpose include compounds represented by the formula $T_aY_bX_{c-b}$ wherein $T_a$ is a transition metal selected from Groups IV-B, V-B and VI-B of the Periodic Table of Elements, Y is oxygen, OR' or NR'$_2$; wherein each R' is independently hydrogen or hydrocarbyl group of 1 to 20 carbon atoms; X is halogen, preferably chlorine or bromine; c has a value corresponding to the valence of the transition metal, $T_a$; b has a value of from 0 to 5 with a value of c-b being from at least 1 up to value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, etc.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Organic electron donors useful in preparation of the stereospecific supported catalyst components of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above, aliphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl esters such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and benzophenone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such a methanethiol, ethanethiol, ethanedithiol, propanethiols, butanethiols, butanedithiols, hexanethiols, and the like, thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are $C_1$-$C_6$ alkyl esters of aromatic carboxylic acids and halogen-, hydroxyl-, oxo-, alkyl, alkoxy-, and/or aryloxy-substituted aromatic monocarboxylic acids. Among these, the alkyl esters of benzoic, halobenzoic, phthalic, terephthalic and isophthalic acids wherein the alkyl group contains 1 to 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, hexyl benzoate, and cyclohexyl benzoate are particularly preferred. Best results are attained through the use of diesters.

In step C, the particles formed in Step B, the transition metal component, and organic electron donor component are reacted at temperatures ranging from about $-10°$ C. to about 170° C., generally over a period of several minutes to several hours, and are contacted in amounts such that the atomic ratio of transition metal to magnesium in the particles (calculated as magnesium in magnesium compound from which the magnesium-containing species is formed) is at least about 0.5:1. Preferably, this ratio ranges from about 0.5:1 to about 20:1. Greater amounts of transition metal can be employed without adversely affecting catalyst component performance, but there typically is no need to exceed a transition metal to magnesium ratio of about 20:1 as only a portion of the transition metal is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up from about 1.0 mole per gram atom of transition metal in the transition metal compound, and preferably from about 0.001 to about 0.6 mole per gram atom of titanium in the transition metal compound. Best results are achieved when this ratio ranges from about 0.01 to about 0.3 mole per gram atom of titanium. The atomic ratio of metal in the Group II or IIIA metal alkyl component to metal in the magnesium hydrocarbyl carbonate component ranges from about 0.001:1 to about 1:1. Preferably, this ratio ranges from about 0.005:1 to about 0.5:1 to provide the best catalyst performance.

It is preferred that the electron donor compound and transition metal compound can be contacted with the precipitated solid particles in the presence of an inert hydrocarbon or halogenated diluent, although other suitable techniques can be employed. Suitable diluents are those materials which are disclosed hereinabove as useful as diluents in steps A or B and which are substantially inert to the components employed and are liquid at the temperature employed or can be maintained in the liquid state through the use of elevated pressure.

The solution of the magnesium-containing species comprises at least one alcohol containing from 1 to about 18 carbon atoms at a ratio of the total number of moles of the at least one alcohol-to-the number of moles of the aforesaid magnesium-containing compound in the range of from about 1.45:1, preferably from about 1.6:1, to about 2.3:1, preferably to about 2.1:1. Alcohols that are suitable for use in the present invention include those having the structure HOR wherein R is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used, such as ethanol, 1- or 2-propanol, t-butyl alcohol, cyclohexanol, 2-ethylhexanol, the amyl alcohols including isoamyl alcohol, and the branched alcohols having 9 to 12 carbon atoms. Preferably, 2-ethylhexanol or ethanol is employed.

All or only a portion of the total amount of the at least one alcohol employed or any component thereof can be present in the aforesaid liquid when the magnesium-containing species is formed from the magnesium-containing compound or when the magnesium-containing species is dissolved in the aforesaid liquid in step A. In the alternative, all or a portion of the at least one alcohol employed or any component thereof can be added to the aforesaid liquid after the magnesium-containing species is formed from the magnesium-containing compound or after the magnesium-containing species is dissolved in the aforesaid liquid, but the total amount of the aforesaid at least one alcohol must be added before or when the solid particles are being precipitated in step B, except as described hereinbelow when the solid particles are reprecipitated.

Preferably, the at least one alcohol comprises a combination of a relatively lower molecular weight monohydroxy alcohol containing from 2 to 4 carbon atoms and a relatively higher molecular weight monohydroxy alcohol containing from 5 to about 18 carbon atoms, and at a ratio of the number of moles of the relatively lower molecular weight alcohol-to-the total number of moles of total alcohols in the range of from about 0.45:1, preferably from about 0.5:1, to about 0.85:1, preferably to about 0.8:1. Preferably, the relatively lower molecular weight alcohol is ethanol and the relatively higher molecular weight alcohol is 2-ethylhexanol or an amyl alcohol. Therefore, as indicated hereinabove, all or a portion of either or both components of this combination can be present in the aforesaid liquid when the magnesium-containing species is formed from the magnesium-containing compound or when the magnesium-containing species is dissolved in the aforesaid liquid in step A, or can be added to the aforesaid liquid after the magnesium-containing species is formed from the magnesium-containing compound or after the magnesium-containing species is dissolved in the aforesaid liquid.

The benefits resulting from the use of the aforesaid at least one alcohol in the method of the present invention to produce the catalyst or catalyst component of the present invention at a level in the range of from about 1.45 to about 2.3 total moles of the at least one alcohol per moles of the magnesium-containing compound are (1) the production of a reduced number of catalyst fines and hence of small polymer or copolymer particles produced using such catalyst or catalyst component; and (2) the production of catalyst or catalyst component having a larger mean particle size and improved particle size distribution the use of which affords polymer or copolymer also having a larger mean particle size and improved particle size distribution and bulk density; (3) a substantially less viscous solution in the aforesaid step A. These benefits are further enhanced by the use of the aforesaid combination of the relatively lower and relatively higher molecular weight alcohols.

In a highly preferred embodiment of the present invention, prior to step C, the particles precipitated in step B are reprecipitated from a solution containing a cyclic ether, and then the reprecipitated particles are treated in step C with a transition metal compound and an electron donor.

In a typical reprecipitation procedure, the particles precipitated in step B are entirely solubilized in the cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles formed in step B. Also, thioethers such as tetrahydrothiophene can be used. In some instances, such as the use of 2,2,5,5-tetrahydrofuran and tetrahydropyran-2-methanol, reprecipitation occurs upon heating to about 130°-185° F. Other compounds may be used which act in an equivalent manner, i.e., materials which can solubilize the particles formed in step B and from which solid uniform particles can be reprecipitated, such as cyclohexene oxide, cyclohexanone, ethyl acetate and phenyl acetate. Mixtures of such suitable materials may also be used.

When the reprecipitation step is employed, all or only a portion of the total amount of the at least one alcohol employed or any component thereof can be added to the solution of the aforesaid dissolved particles in the cyclic ether, but the total amount of the aforesaid at least one alcohol must be added before or when the solid particles are being reprecipitated.

A suitable diluent that can be used in any of the aforesaid steps A, B or C or in the reprecipitation step should be substantially inert to the reactants employed and preferably is liquid at the temperature employed. It is also contemplated to conduct the particular step in question at an elevated pressure so that lower boiling diluents can be used even at higher temperatures. Typical suitable diluents are aromatic or substituted aromatic liquids, although other hydrocarbon-based liquids may be used. Aromatic hydrocarbons, such as toluene, and substituted aromatics have been found suitable. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosine. Mixtures of diluents may be used. One useful diluent component is Isopar G which is a $C_{10}$-average isoparaffinic hydrocarbon boiling at 156°-176° C. Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid steps A, B and C and the aforesaid reprecipitation step is conducted in the substantial absence of water, oxygen, carbon monoxide, and other extraneous materials capable of adversely affecting the performance of the catalyst or catalyst component of this invention. Such materials are conveniently excluded by carrying out the pretreatment in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpenetene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or heating of reactant.

As a result of the above-described preparation there is obtained from step C a solid reaction product suitable for use as a catalyst or catalyst component. Prior to such use, it is desirable to remove incompletely-reacted starting materials from the solid reaction product from step C. This is conveniently accomplished by washing the solid from step C, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared from step C may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the solid reaction product from step C. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixture of Lewis acids can be employed if desired. Such Lewis acid may be used in a compatible diluent.

Although not required, the solid reaction product from step C may be washed with an inert liquid hydrocarbon or halogenated hydrocarbon before contact with a Lewis acid. If such a wash is conducted, it is preferred to substantially remove the inert liquid prior to contacting the washed solid with Lewis acid.

Although the chemical structure of the catalyst or catalyst components of this invention is not known precisely, the components generally comprise from about 1 to about 6 wt. % titanium, from about 10 to about 25 wt. % magnesium, and from about 45 to about 65 wt. % halogen. Preferably, the catalyst component of this invention comprise from about 2.0 to about 4 wt. % titanium, from about 15 to about 21 wt. % magnesium and from about 55 to about 65 wt. % chlorine.

Prior to use in the polymerization or copolymerization of alpha-olefins, the catalyst or catalyst component of this invention can be further activated by comminution. Techniques of comminution by ball-milling generally are known in the art. Typically, the catalyst component and hard, nonreactive balls, such as steel or carborundum balls, are placed in a closed container which is agitated usually by rolling, shaking or rocking. Such comminution is continued for a few hours up to several days, typically about 12 to 36 hours, until the catalyst or catalyst component is ground to a desired particle size typically about 5 to about 50 microns. Since mechanical action of comminution can cause a temperature increase in the comminuting mixture, care should be taken to keep the temperature below the decomposition temperature of the catalyst or catalyst component. Typically, the comminuting mixture should be kept at below about 50° C.

Prepolymerization and encapsulation of the catalyst or catalyst component of this invention can also be carried out prior to being used in the polymerization or copolymerization of alpha olefins.

In general, it is highly preferred that the catalyst or catalyst component of this invention is prepolymerized with an alpha-olefin before use as a polymerization or copolymerization catalyst or catalyst component. In prepolymerization, catalyst or catalyst components of this invention is preferably prepolymerized with an alpha-olefin before use as a polymerization or copolymerization catalyst or catalyst component. In prepolymerization, catalyst or catalyst component and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst or catalyst component weight ratio of the resulting prepolymerized component is about 0.1:1 to about 20:1. Prepolymerization forms a coat of polymer around catalyst or catalyst component particles which in many instances improves particle morphology, activity, stereospecificity, and attrition resistance. A particularly useful prepolymerization procedure is described in U.S. Pat. No. 4,579,836, which in its entirety is specifically incorporated herein by reference.

Typically, the catalyst or catalyst component of this invention is employed in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those or magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

A typical catalyst system for the polymerization or copolymerization of alpha olefins is formed by combining the supported titanium-containing catalyst or catalyst component of this invention and an alkyl aluminum compound, together with modifiers including an electron donor and, preferably, a silane. Typically, useful aluminum-to-titanium atomic ratios in such catalyst systems are about 10 to about 500 and preferably about 30 to about 300. Typical aluminum compound-to-electron donor molar ratios in such catalyst systems are about 5 to about 40. Typical aluminum-to-silane compound molar ratios in such catalyst systems are about 8 to about 30.

To maximize the activity and stereospecificity of this cocatalyst system, it is preferred to incorporate one or more modifiers, typically electron donors, and including compounds such as silanes, mineral acids, organometallic chalcogenide derivatives of hydrogen sulfide, organic acids, organic acid esters and mixtures thereof.

Organic electron donors that are useful as modifiers of the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can also be employed.

Preferred organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously contains an aliphatic or aromatic silane modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiR_4$, wherein R is independently R' or OR' with R' having 1 to about 20 carbon atoms. Preferred aliphatic silanes include isobutyltrimethoxysilane, diisobutyldimethoxysilane, diisopropyldimethoxysilane, di-t-butyldimethoxysilane, and t-butyltrimethoxysilane.

The catalyst or catalyst component of this invention is useful in polymerization or copolymerization of alpha-olefins such as ethylene and propylene, and are most useful in stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 20 mole % ethylene or a higher alpha-olefin. According to the invention, highly crystalline polyalpha-olefins are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control polymer or copolymer molecular weights, and other conditions well known to persons of skill in the art. Slurry-, bulk-, and vapor-phase polymerization or copolymerization processes are contemplated herein.

The amount of the catalyst or catalyst component of this invention to be employed varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi, although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, Chloronaphthalene, ortho-dichlorobenzene, tetrahydronaphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For copolymerization, the homopolymer formed from the first monomer in the first reactor is reacted with the second monomer in the second reactor. A quench liquid which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following examples.

EXAMPLE 1

Step A

Formation of Magnesium Alkyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution was transferred to a two-liter bottle. The total volume of this solution was 1530 milliliters. 1.320 moles of 2-ethylhexanol were employed per mole of magnesium ethoxide. The solution contained 0.10 gram-equivalents of magnesium ethoxide per milliliter.

Step B

Formation of Solid Particles

Into a 1.6-liter reactor was charged 308 milliliters of toluene, 21.6 milliliters of trimethylethoxysilane, 28.5 milliliters of titanium tetrachloride under a blanket of dry nitrogen. After the mixture was stirred at 300 rpm at 22°-27° C. for 15 minutes, a mixture of 168 milliliters of the Step A magnesium hydrocarbyl carbonate solution and 3.0 ml dry ethanol were added to the reactor through a bomb. 0.347 mole of ethanol was employed per mole of magnesium ethoxide. 1.667 total moles of ethanol and 2-ethylhexanol were employed per mole of magnesium ethoxide. 0.208 mole of ethanol was employed per mole of all alcohols employed. Solid particles precipitated.

Step C

Reprecipitation

After the mixture containing the precipitate was stirred for five additional minutes, 75 milliliters of tetrahydrofuran (THF) were added rapidly through a syringe. The temperature in the reactor increased from 26° C. to 38° C. Whereupon, the stirring was maintained at 300 rpm and the temperature rose to 60° C. within 15 minutes. The first formed solid dissolved in the THF solution. Within about 10 minutes after the THF addition, a solid began to reprecipitate from solution. Stirring was continued for 1 hour at 60° C. after which agitation was stopped and the resulting solid was allowed to settle. Supernatant was decanted and the solid washed three times with 75-milliliters portions of toluene.

Step D

Titanium (IV) Compound Treatment

To the solid from Step C in the one-liter reactor were added 188 milliliters of toluene and 75 milliliters of titanium tetrachloride. The resulting mixture was heated to 80° C. within 30 minutes and stirred at 300 rpm for one hour. After stirring was stopped, the resulting solid was allowed to settle and the supernatant was decanted. After 225 milliliters of toluene, 75 milliliters of titanium tetrachloride and 3.5 milliliters of di-n-butylphthalate were added to the resulting solid, the mixture was stirred at 300 rpm at 117° C. for 90 minutes, the solid was allowed to settle and supernatant liquid was decanted. After 143 milliliters of toluene were added, the mixture was heated to 91° C. for 30 minutes. After the agitation was stopped, the solid was allowed to settle and the supernatant decanted. An additional 188 milliliters of titanium tetrachloride was added, the mixture heated at 91° C. under agitation for 30 minutes, after which the agitation was stopped, and the supernatant liquid was decanted. The residue washed five times with 75 milliliter portions of hexane and the solids recovered. (8.8 g).

The particle size distribution of the catalyst was measured using a laser diffraction particle size analyzer (Shimadzu Model SALD-1100) and found to have a particle size distribution (PSD) of $d_{10}$ of 20 microns, $d_{50}$ of 38.9 microns, and $d_{90}$ of 59.4 microns. "$d_{10}$," "$d_{50}$", and "$d_{90}$" mean that 10, 50 and 90 percent, respectively, of the particles have particle sizes smaller than 20, 38.9 and 59.4 microns, respectively. $d_{50}$ is termed the median particle size.

A batch gas phase polymerization of propylene gave a polymer yield of 20.2 kilograms per gram of catalyst, with 0.5% extractables, 3.5 MFR, 24.3 lbs/ft$^3$ bulk density (BD), and 8.8 ppm Mg in the polymer. The batch gas phase propylene polymerization evaluation was performed in a 2.5 liter reactor at 71° C. at 300 pounds per square inch gauge including 36 millimoles of hydrogen with stirring at 40 revolutions per minute with a reaction time of 2 hours. Triethylaluminum (TEA) was used as a cocatalyst together with diisobutyldimethoxysilane as a modifier. The reactor was charged with TEA/modifier, titanium component, hydrogen, and propylene in that order. "Yield" (grams of polymer produced per gram of solid catalyst component) was determined by magnesium analysis of the polymer product and in some cases based on the weight of solid catalyst used to polymer produced. "Extractables" were determined by measuring the loss in weight of a dry sample of ground polymer after being extracted in boiling n-hexane for three to six hours.

EXAMPLE 2

The first three steps of Example 1 were repeated, except that 3.37 milliliters of ethanol was used, the slurry was transferred into a dry box, filtered and dried (13.2 g). Thus, 0.227 mole of ethanol was employed per mole of total ethanol and 2-ethylhexanol, and 1.710 total moles of all alcohols were employed per mole of magnesium ethoxide. The PSD of the solid (catalyst support) was as follows: $d_{10}=25.3$; $d_{50}=51.6$; $d_{90}=81.1$ microns.

EXAMPLE 3

The first three steps of Example 1 were repeated, but the amount of chemicals used were reduced to ⅔ except for the magnesium hydrocarbyl carbonate solution used, which was a mixture of 150 milliliters of Step A solution and 3 milliliters of absolute ethanol. Thus, 0.23 mole of ethanol was employed per mole of total ethanol and 2-ethylhexanol and 1.711 total moles of all alcohols were employed per mole of magnesium ethoxide. The amount of solid support isolated was 13.9 g and the PSD was $d_{10}=18.9$; $d_{50}=45.3$; $d_{90}=79.3$ microns.

COMPARATIVE EXAMPLE A

Example 1 was repeated except for the hydrocarbyl carbonate (Step A) solution used, which was 171 milliliters without the addition of any ethanol. Thus, 1.320 moles of 2-ethylhexanol (the only alcohol added) were employed per mole of magnesium ethoxide. The solid after the first three steps (support) had a PSD of $d_{10}=13.1$; $d_{50}=29.6$; $d_{90}=49.9$ microns. The first activation was carried out at 225° F. The final catalytic solid (after Step D) was 13.3 g and had a PSD of $d_{10}=12.7$; $d_{50}=28.2$; and $d_{90}=46.9$ microns.

Batch gas phase polymerization evaluation by the aforesaid process showed a yield of 20.8 Kg/g with a BD of 24.2 lbs/ft³.

EXAMPLE 4

Example 1 was repeated, except that the magnesium hydrocarbylcarbonate solution was a mixture of 225 milliliters Step A solution and 15 milliliters of 2-ethylhexanol instead of the ethanol added in Example 1. The first activation was carried out at 113° C. The support PSD was $d_{10}=25.4$; $d_{50}=48.1$; and $d_{90}=72.3$ microns. Thus, 1.808 moles of 2-ethylhexanol (the only alcohol added) were employed per mole of magnesium ethoxide. The catalyst (7.9 g) PSD was $d_{10}=25.5$; $d_{50}=49.5$; and $d_{90}=75.4$ microns.

Batch gas phase polymerization evaluation of the catalyst by the aforesaid procedure showed a yield of 20.7 Kg/g and 24.8 lbs/ft³ BD.

EXAMPLE 5

The procedure of Example 1 was repeated except for Step A, which was modified as follows. Into the same apparatus, 153 grams of magnesium ethoxide, 145 milliliters of dry ethanol and 1,231 milliliters of toluene were agitated under 30 psig of $CO_2$ at ambient temperature for 16 hours. Thus, ethanol was the only alcohol employed, and 1.847 moles of ethanol were employed per mole of magnesium ethoxide. The resulting solution was transferred to a two-liter bottle. The total volume of this solution was 1530 milliliters and contained 0.10 gram-equivalents of magnesium ethoxide per milliliter. The prepared catalytic solid (8.3 grams) had a PSD of $d_{10}=17.9$; $d_{50}=34.3$; and $d_{90}=51.8$ microns. Batch gas phase evaluation by the aforesaid procedure showed a yield of 15.4 Kg/g, 0.90% extractables, a 22.9 lbs/ft3 BD and a 4.4 MFR.

EXAMPLE 6

Steps A, B and C of Example 5 were repeated except for using 267 milliliters of isoamyl alcohol instead of ethanol, and 1109 milliliters of toluene. Thus, isoamyl alcohol was the only alcohol employed and 1.833 moles of isoamyl alcohol were employed per mole of magnesium ethoxide. The isolated support (16.6 grams) had a PSD of $d_{10}=19.9$; $d_{50}=39.6$; $d_{90}=61.4$ microns.

EXAMPLE 7

A magnesium hydrocarbyl carbonate solution was prepared as in Example 5, but changing the following chemicals: 153 grams magnesium ethoxide, 137 milliliters of 2-ethylhexanol, 92.6 milliliters of absolute ethanol and 1146 milliliters of toluene, under 30 psig of $CO_2$. 205 milliliters of this solution was used in the preparation of a catalyst as described in Steps B, C, and D of Example 1, except for the first activation temperature which was 113° C. Thus, 0.64 mole of ethanol was employed per mole of ethanol and 2-ethylhexanol combined, and 1.84 total moles of ethanol and-2-ethylhexanol were employed per mole of magnesium ethoxide. The catalytic solid had a PSD of $d_{10}=21.6$; $d_{50}=47.2$; and $d_{90}=77.5$ microns and batch gas phase evaluation by the aforesaid procedure showed yields between 16.3–21.7 Kg/g, extractables of 0.44–1.05%, BD of 24.8–26.7 lbs/ft³, MFR of 3.3 to 3.6.

EXAMPLE 8

The first three steps of Example 7 were repeated except for 175 milliliters of toluene in Step B and a 15 minute delay in the application of heating after the THF addition. The obtained support (13.4 grams) has the following PSD: $d_{10}=19.9$; $d_{50}=46.7$; and $d_{90}=80.6$ microns.

EXAMPLE 9

Example 8 was repeated but the hydrocarbyl carbonate solution was added at between 82° and 95° F. within 15 minutes and the THF was added at 41° C., with the exotherm increasing the temperature to 53° C. Step D was carried out as in Example 1, except for the first activation which was carried out at 113° C. The catalytic solid (8.6 grams) had a PSD of $d_{10}=20.3$; $d_{50}=45.6$; and $d_{90}=76.0$ microns. The batch gas phase polymerization evaluation by the aforesaid procedure showed a yield that was 21.3 Kg/g and a BD of 26.4 lbs/ft³.

EXAMPLE 10

Step A was prepared as in Example 5, but charging 153 grams of magnesium ethoxide, 100 milliliters of 2-ethylhexanol, 106 milliliters of absolute ethanol and 1171 milliliters of toluene under 30 psig of $CO_2$. 205 milliliters of this solution was used to prepare a catalytic solid. Following Steps B, C and D of Example 1, the catalytic solid (8.7 g) had a PSD of $d_{10}=19.6$; $d_{50}=39.8$; and $d_{90}=62.5$ microns. The batch gas phase polymerization evaluation by the aforesaid procedure showed a yield that was 21.3 Kg/g and a BD of 26.8 lbs/ft³.

From the above description, it is apparent that the objects of the present invention have been achieved. While only certain embodiments have been set forth, alternative embodiments and various modifications will be apparent from the above description to those skilled in the art. These alternatives are considered equivalents and within the spirit and scope of the present invention.

Having described the invention, what is claimed is:

1. A solid, hydrocarbon-insoluble catalyst or catalyst component for the polymerization or copolymerization of alpha-olefins, comprising a product formed by:
   A. forming a solution of a magnesium-containing species in a liquid, wherein the magnesium-containing species is formed by reacting a magnesium-containing compound with carbon dioxide or sulfur dioxide;
   B. precipitating solid particles from the solution of the magnesium-containing species by treatment with a transition metal halide; and
   C. treating the precipitated particles with a transition metal compound and an electron donor;
wherein the solution of the magnesium-containing species comprises at least one alcohol containing from 2 to 18 carbon atoms and wherein the ratio of the total number of moles of the at least one alcohol-to-the number of moles of the aforesaid magnesium-containing compound is in the range of from about 1.45:1 to about 2.3:1.

2. The catalyst or catalyst component of claim 1 wherein at least a portion of the total amount of the alcohol employed is present in the aforesaid liquid when the magnesium-containing species is formed from the aforesaid magnesium-containing compound.

3. The catalyst or catalyst component of claim 1 wherein at least a portion of the total amount of alcohol employed is added to the aforesaid liquid after the magnesium-containing species is formed from the aforesaid magnesium-containing compound.

4. The catalyst or catalyst component of claim 3 wherein the total amount of alcohol employed is added as or before the solid particles are precipitated in step B.

5. The catalyst or catalyst component of claim 1 wherein the ratio of the total number of moles of the at least one alcohol-to-the number of moles of the aforesaid magnesium-containing compound is in the range of from about 1.6:1 to about 2.1:1.

6. The catalyst or catalyst component of claim 1 wherein the aforesaid at least one alcohol comprises a combination of a relatively lower molecular weight alcohol containing from 2 to 4 carbon atoms and a relatively higher molecular weight alcohol containing from 5 to 18 carbon atoms is employed and at a ratio of the number of moles of the relatively lower molecular weight alcohol-to-the total number of moles of total alcohols in the range of from about 0.45:1 to about 0.85:1.

7. The catalyst or catalyst component of claim 6 wherein the ratio of the number of moles of the relatively lower molecular weight alcohol-to-the total number of moles of total alcohols is in the range of from about 0.5:1 to about 0.8:1.

8. The catalyst or catalyst component of claim 6 wherein the relatively lower molecular weight alcohol comprises ethanol and the relatively higher molecular weight alcohol comprises 2-ethylhexanol.

9. The catalyst or catalyst component of claim 6 wherein at least a portion of the total amount of the relatively lower molecular weight alcohol employed is added after the magnesium-containing species is formed from the aforesaid magnesium-containing compound.

10. The catalyst or catalyst component of claim 6 wherein at least a portion of the total amount of the relatively higher molecular weight alcohol employed is added after the magnesium-containing species is formed from the aforesaid magnesium-containing compound.

11. The catalyst or catalyst component of claim 1 wherein the aforesaid magnesium-containing compound in step A is a magnesium alcoholate.

12. The catalyst or catalyst component of claim 11 wherein the magnesium alcoholate is magnesium ethoxide.

13. The catalyst or component of claim 11 wherein the magnesium-containing species formed is a magnesium hydrocarbyl carbonate.

14. The catalyst or catalyst component of claim 11 wherein the magnesium alcoholate is formed by the reaction of magnesium metal and a lower molecular weight alcohol.

15. The catalyst or catalyst component of claim 1 wherein the aforesaid magnesium-containing compound in step A is a hydrocarbyl magnesium compound.

16. The catalyst or catalyst component of claim 15 wherein the magnesium-containing species formed is a magnesium carboxylate.

17. The catalyst or catalyst component of claim 1 wherein the magnesium-containing compound in step A is reacted with carbon dioxide.

18. The catalyst or catalyst component of claim 1 wherein the transition metal component in step B is a titanium (IV) compound.

19. The catalyst or catalyst component of claim 18 wherein the transition metal component in step B is a titanium tetrachloride.

20. The catalyst or catalyst component of claim 1 wherein the transition metal component in step C is a titanium tetrachloride.

21. The catalyst or catalyst component of claim 1 wherein the magnesium-containing solution in step B is treated with a titanium halide in the presence of a morphology controlling agent.

22. The catalyst or catalyst component of claim 21 wherein the morphology controlling agent is an organosilane.

23. The catalyst or catalyst component of claim 22 wherein the organosilance has a formula: $R_nSiR'_{4-n}$, wherein $n=0$ to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen.

24. The catalyst or catalyst component of claim 1 wherein the particles from step B are treated in step C with titanium tetrachloride and then with titanium tetrachloride in the presence of an electron donor.

25. The catalyst or catalyst component of claim 1 wherein the electron donor in step C is a dialkylphthalate ester.

26. The catalyst or catalyst component of claim 1 wherein the solid particles precipitated in step B are next dissolved and reprecipitated from a cyclic ether and then the reprecipitated particles are treated in step C with a transition metal compound and an electron donor.

27. The catalyst or catalyst of claim 26 wherein the total amount of alcohol employed is added as or before the solid particles are reprecipitated.

* * * * *